Figure 1:
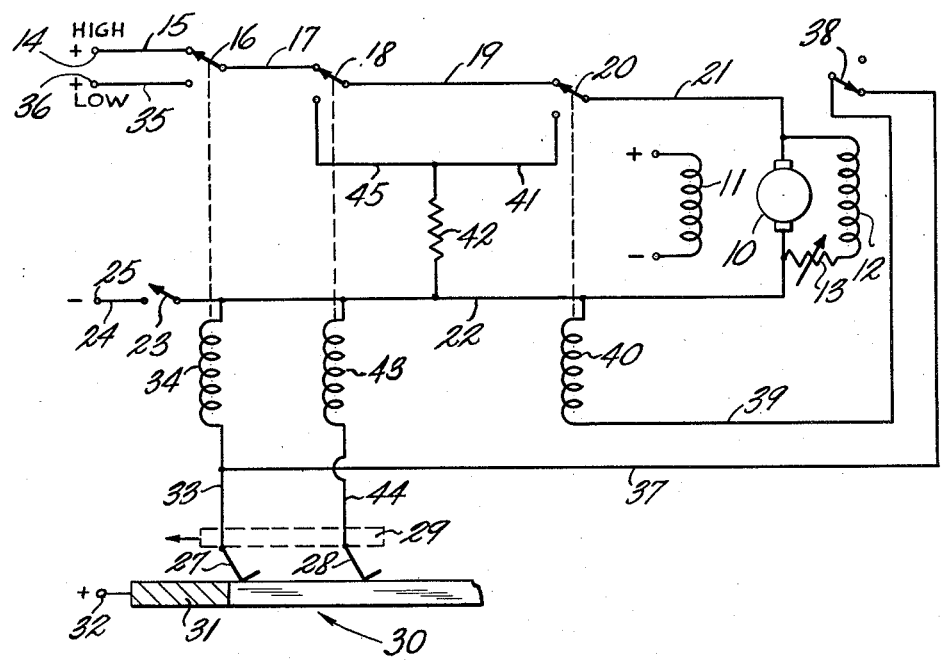

Aug. 21, 1956   C. HILLYER   2,760,135
MOTOR CONTROL CIRCUIT
Filed April 12, 1955

INVENTOR.
CURTIS HILLYER
BY
Campbell, Brumbaugh, Free & Graves
his ATTORNEYS

United States Patent Office 2,760,135
Patented Aug. 21, 1956

2,760,135

MOTOR CONTROL CIRCUIT

Curtis Hillyer, Short Hills, N. J., assignor to Hillyer Instrument Company, Inc., New York, N. Y., a corporation of Delaware Application April 12, 1955, Serial No. 500,721

6 Claims. (Cl. 318—274)

The present invention relates to electrical motor control, and more particularly, to novel and improved apparatus for controlling the on-off operation of an electrical motor used in positioning a controlled element.

A great variety of control circuits have been developed and are in current use for automatically controlling the relative movement of two or more elements, such as a work support table and an automatically operated drill for drilling a hole in work supported by the table. While various types of precision control sensing and indicating apparatuses have been developed, the effectiveness of these apparatuses has been seriously limited by the variable override which occurs when a high speed motor is brought to a stop under different operating conditions of speed, load and stopping distance, and even under the same operating conditions.

It is, therefore, an object of the invention to provide a novel and improved motor control whereby a high speed positioning motor may be brought to a stop in such a way that the element whose position is being controlled by the motor is subject to a predetermined and substantially constant override.

This and other objects of the invention may be achieved by a motor control circuit for a positioning motor, wherein means are provided for substantially reducing the speed of the motor at a predetermined point in space or time before the point at which the motor and controlled element is to be stopped. Means are then provided for causing the motor to be brought to a stop from operation at the reduced speed at a substantially constant point in space or time subsequent to the point at which the reduction of the speed of the motor was initiated and coincident with the predetermined position or time at which it is desired to stop the controlled element.

Figure 2:
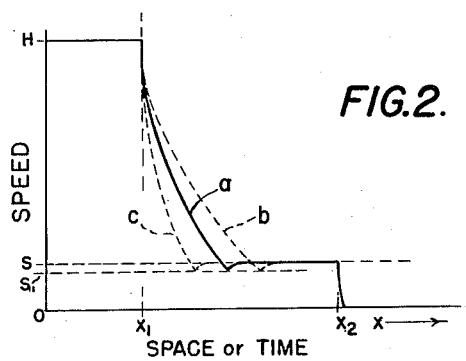

For a more complete understanding of the invention, reference may be had to the following detailed description taken in conjunction with the accompanying figures of the drawing, in which:

Fig. 1 is an electrical schematic diagram of an exemplary embodiment of a motor control circuit, in accordance with the invention; and Fig. 2 is a set of speed curves showing the operation of the system.

Referring now to Fig. 1, the control circuit is shown in relation to a shunt connected D. C. motor 10, which may have any desired power rating. The field 11 of the motor is separately excited. A voltage sensitive relay 12 of a conventional type may be connected across the armature of the motor 10. In series with the voltage sensitive relay 12 is an adjusting means 13, which may take the form of a variable resistor, for adjusting the drop-out point of the voltage sensitive relay 12, as will be discussed later.

The motor 10 is normally energized from a D. C. voltage source having sufficient value to operate the motor at its normal rated speed. The rated speed or high speed energizing circuit for the motor 10 includes a positive terminal 14 of the rated speed D. C. voltage source, a conductor 15, a relay operated switch arm 16, a conductor 17, a relay operated switch arm 18, a conductor 19, a relay operated switch arm 20, a conductor 21, the armature of the motor 10, a conductor 22, a control switch 23 for initially starting the motor 10, a conductor 24 and a negative terminal 25 for the voltage source.

The control switch 23 may be operated in any suitable manner, such as by a control relay in an automatic positioning control system.

A pair of brushes 27 and 28 are adapted to be carried by a suitable support means such as a brush arm 29 and are adapted to pass over a stationary contact plate 30 having one or more electrical contacts 31 therein, which may be energized by a positive voltage source 32. The brush arm 29 is adapted for movement relative to the contact plate 30, for example, in the direction of the arrow. The brushes 27 and 28 are adapted to make electrical contact with the contacts 31 and are displaced from each other in the direction of travel, so that the brush 28 lags the brush 27 by a predetermined amount. As will be seen from the following discussion, the brush 27 when it makes electrical contact with an energized contact 31 causes the speed of the motor 10 to drop from its normal rated speed to a predetermined substantially reduced speed. The brush 28 when it makes contact with an energized contact 31 causes the motor 10 to be dynamically braked from the reduced speed to a complete stop.

The brush 27 is connected by a conductor 33 to one terminal of a relay 34, the other terminal of which is connected through the conductor 22, the control switch 23 and the conductor 24 to the negative supply terminal 25. The relay operated contact arm 16 is controlled by the relay 34. Therefore, when the brush 27 makes electrical contact with the energized contact 31, the energizing circuit for the relay 34 is completed between the positive terminal 32 and the negative terminal 25, and the contact arm 16 is caused to break contact with the conductor 15 and establish contact with a conductor 35 connected to a source of D. C. voltage sufficient to operate the motor at a substantially reduced speed.

The brush 27 is also connected through the conductor 33, a conductor 37, a relay contact arm 38, and a conductor 39 to one terminal of a relay 40. The other terminal of the relay 40 is connected through the conductor 22, the control switch 23, and the conductor 24 to the negative terminal 25. The switch arm 20 is operated by the relay 40. Therefore, when the brush 27 makes electrical contact with the energized contact 31 the energizing circuit for the relay 40 from the positive terminal 32 to the negative terminal 25 is also completed.

The energization of the relay 40 causes the switch arm 20 to break contact with the conductor 19 and establish contact with a conductor 41 leading through the dynamic braking resistor 42 to the conductor 22. Thus the dynamic braking resistor 42 is placed across the armature of the motor 10 at the same time that the rated voltage energizing circuit for the D. C. motor 10 is broken or interrupted by the operation of the switch arm 16.

As shown by the speed curves in Fig. 2, when contact is made between the brush 27 and the energized contact 31 at a point $x_1$ in space or time, the motor is dynamically braked and the speed sharply drops off from the rated value H until it reaches the predetermined speed $S_1$ (curve $a$). When the speed approaches the value $S_1$, the braking action is stopped and the reduced speed energizing circuit for the motor 10 is completed, causing the motor 10 to operate at the reduced speed until the point $x_2$, at which the speed sharply drops off to a standstill.

This operation is accomplished in the following manner. As the motor 10 is dynamically braked by the braking resistor 42 and the speed starts to approach the speed $S_1$, the voltage in the voltage responsive relay 12 starts to drop. As the voltage in the relay 12 continues to decrease, the relay 12 drops out at a preset value determined by the variable resistor 13. When the relay 12 drops out, the switch arm 38 is released, thereby interrupting the energizing circuit for the relay 40 and opening the circuit to the dynamic braking resistor 42. At the same time that the switch arm 20 is released by the relay 40, the low or reduced speed energizing circuit for the motor 10 is completed from the reduced speed D. C. voltage source between terminals 36 and 25.

The speed of the motor 10 is then brought up to a reduced speed S and the brush arm 29 continues to move in the direction of the arrows, so that the brush 28 is brought into contact with the energized contact 31. When this occurs, an energizing circuit is completed for a relay 43 from the plus terminal 32 through the energized contact 31, the brush 28, a conductor means 44, the relay 43, the conductor 22, the control switch 23 and the conductor 24 to the negative terminal 25. The energization of the relay 43 causes the switch arm 18 to interrupt the reduced speed energizing circuit for the motor 10 at the point between the conductors 17 and 19. The switch arm 18 also completes a circuit from the conductor 19 through a conductor 45 and the dynamic braking resistor 42 to the conductor 22, thereby placing the dynamic braking resistor 42 across the armature of the motor 10 and causing the motor 10 to be braked to a stop.

When an electrical motor is dynamically braked from a high speed, a number of variables come into play which make it extremely difficult if not impossible to determine the exact point in time or space at which the speed of the motor will be reduced to a preselected value. For example, as shown by the dotted curves b and c in Fig. 2, as well as by the previously mentioned curve a, the speed of the motor 10 when dynamically braked may drop from the normal rated speed to the preselected reduced speed over a relatively large range of time or space values. From this it is obvious, that if the motor 10 is directly dynamically braked to a complete stop, a large range of possible error would exist between the point in space or time at which it is desired to stop the controlled element and that at which it is actually stopped.

In accordance with the invention, there is provided a system wherein this range of error is substantially eliminated. To accomplish this, the spacing between the leading brush 27 and the lagging brush 28 is made sufficiently large to allow for the deceleration of the motor until the relay 12 drops out and the application of the low constant voltage to the motor to cause operation of the motor at the constant reduced speed before the final stopping operation is commenced. Then, since the amount of deceleration required from the reduced speed to a stop condition, is relatively small, there is an extremely small and insignificant range of possible variation in the deceleration time to the stop condition, so that the motor and the controlled element are brought to a complete stop within a substantially fixed determinable amount of overdrive, which of itself is usually quite small.

Because of this slow and uniform speed of approach to the stopping point, the final stopping action of the motor is always the same and can be made to repeat quite accurately regardless of the initial conditions of speed and load. As a practical matter, since the initial braking action from the normal rated speed of the motor to the selected reduced speed requires a very short time, the interval between the slow and stop actions is usually so short as to be almost imperceptible and the action appears to be substantially continuous.

The above disclosed embodiment is meant to be merely exemplary, and it will be obvious to those skilled in the art that it is susceptible of variation and modification without departing from the spirit and scope of the invention. For example, while dynamic braking has been utilized in the exemplary embodiment, other well-known braking techniques, such as electro-mechanical braking, can be employed to produce the required decelerations, in accordance with the principles of the invention. Further instead of using electrically energized contacts 31 and brushes 27 and 28 to determine the transition points for the operation of the disclosed motor control, it will be evident that other conventional types of sensing and switching means such as photoelectric or magnetic sensing means may be used. Therefore, the invention is deemed to be limited only by the appended claims.

I claim:

1. A motor control circuit for an electrical motor adapted to be operated at a normal rated speed and at a reduced speed for causing the motor to be stopped at a predetermined point in space or time, comprising an electrically energizable motor having an armature, circuit means for causing said electrically energizble motor to be selectively operated at one of two speeds, means for braking said electrically energizable motor, selectively operable means for causing said braking means to reduce the speed of said electrically energizable motor from the higher of said two speeds, means responsive to a drop in voltage across the armature of said electrically energizable motor to a predetermined value for disabling said braking means and for causing said electrically energizable motor to be operated at the lower of said two speeds and another selectively operable means for deenergizing said electrically energizable motor and for causing said braking means to brake said electrically energizable motor.

2. A motor control circuit, comprising an electrically energizable motor having an armature, a first source of electrical energy adapted to cause said motor to operate at a given speed, a second source of electrical energy adapted to cause said motor to operate at a reduced speed, braking means for decelerating said motor, said motor being normally operated at said given speed, first selectively operable switching means for disconnecting said motor from said first source of electrical energy and for causing said braking means to decelerate said motor to said reduced speed, voltage responsive means connected across said armature of said motor to disable said braking means when the voltage across said armature is reduced to a preselected value and to connect said motor to said second source of electrical energy and second selectively operable switching means for disconnecting said motor from both said first and second sources of electrical energy and for causing said braking means to decelerate said motor.

3. A motor control circuit, comprising an electrically energizable motor having an armature, a first source of electrical energy adapted to be connected to said energizable motor for operating said motor at a given speed, a second source of electrical energy adapted to be connected to said motor to operate said motor at a reduced speed, said motor being normally connected to said first source of electrical energy, braking means for decelerating said motor, first switching means for selectively connecting said electrically energizable motor to said first source of electrical energy or said second source of electircal energy, second switching means for selectively disconnecting said motor from the one of said first and second sources of electrical energy to which it is connected by said first switch means and for causing said braking means to decelerate said motor, first selectively operable control means for operating said first switch means to connect said motor to said second source of electrical energy and to operate said second switch means to cause said braking means to decelerate said motor, voltage responsive means responsive to the voltage across said motor armature for disabling said braking means when said voltage across said motor armature decreases to a predetermined value, and second selectively operable control means for operating said second switching means when said electrically energizable motor is operating at said reduced speed to further decelerate said motor.

4. A motor control circuit, comprising an electrically energizable motor having an armature, a first source of electrical energy adapted to be connected to said electrically energizable motor for operating said motor at a given speed, a second source of electrical energy adapted to be connected to said motor to operate said motor at a reduced speed, said motor being normally connected to said first source of electrical energy, a dynamic braking resistor adapted to be connected across said armature of said motor for decelerating said motor, first switching means for selectively connecting said electrically energizable motor to said first source of electrical energy or said second source of electrical energy, second switching means for selectively disconnecting said motor from the one of said first and second sources of electrical energy to which it is connected by said first switch means and for connecting said dynamic braking resistor across said armature of said motor, first selectively operable control means for operating said first switch means to connect said motor to said second source of electrical energy and to operate said second switch means to connect said dynamic braking resistor across said armature of said motor, voltage responsive means responsive to the voltage across said motor armature for disconnecting said dynamic braking resistor when said voltage across said motor armature decreases to a predetermined value, and second selectively operable control means for operating said second switching means when said electrically energizable motor is operating at said reduced speed to further decelerate said motor.

5. A motor control circuit, comprising an electrically energizable motor having an armature, a dynamic braking resistor adapted to be connected across said armature of said motor for decelerating said motor, a first source of electrical energy adapted to operate said electrically energizable motor at a given speed, a second source of electrical energy adapted to operate said electrically energizable motor at a reduced speed, an energizing circuit for selectively coupling said electrically energizable motor to said first or second sources of electrical energy including, in series relation, first relay operated switch means for selectively connecting said electrically energizable motor to either said first or second sources of electrical energy, second relay operated switch means for disconnecting said electrically energizable motor from said first and second sources of electrical energy and for connecting said dynamic braking resistor across said motor armature, and third relay operated switch means for selectively disconnecting said electrically energizable motor from said first and second sources of electrical energy and for connecting said dynamic braking resistor across said motor armature, first relay means for operating said first switch means, second relay means for operating said second switch means, third relay means for operating said third switch means, first selectively operable control means for energizing said first relay means and said third relay means, voltage responsive relay means connected across said motor armature for deenergizing said third relay means when the voltage across said motor armature decreases to a predetermined value, and second selectively operable control means adapted to be operated after said first selectively operable control means for energizing said second relay means.

6. A motor control circuit as described in claim 4, wherein said voltage responsive relay means is adjustable.

References Cited in the file of this patent

UNITED STATES PATENTS 2,583,301    Mozzanini et al.     Jan. 22, 1952